Nov. 15, 1960            L. LEA            2,960,680

SAFETY-STOP AND DISTRESS SIGNALLING SYSTEMS

Filed May 4, 1959

INVENTOR,
LAWRENCE LEA,
BY
ATTORNEY

2,960,680

SAFETY-STOP AND DISTRESS SIGNALLING SYSTEMS

Lawrence Lea, 1683 University Ave., Bronx, N.Y.

Filed May 4, 1959, Ser. No. 810,925

3 Claims. (Cl. 340—70)

The present invention relates to signal light apparatus for motor vehicles of all sorts and is automatically operated every time the foot brake is applied and every time the drive is put in reverse. Also, it can be manually operated to indicate that the driver needs help.

An object of this invention is to provide novel and improved signal light apparatus for motor vehicles, which when operated as set forth, automatically progressively diminish in illumination intensity and then progressively come to maximum illumination intensity, and during the interval of their operation, continuously repeat such cycle.

Another object thereof is to provide signal light apparatus of the character described, of novel and improved construction, which is easily installed in present vehicles to operate in conjunction with the existing signal light system, or to be installed in new vehicles being manufactured, to serve in place of the usual stop lights operated upon effective shift of the foot brake, besides having their other mentioned functions.

A further object thereof is to provide novel and improved signal light apparatus of the kind set forth, which is reasonably cheap to manufacture, easy to install, efficient in operation and which is effective for distress signalling and for the prevention of accidents because of their effective alerting action.

Other objects and advantages will become apparent as this disclosure proceeds.

For a practice of this invention, the new signal light may be comprised of a casing closed by a glass lens and housing a motor on whose shaft is a flat vane, which in its movement, passes between said lens and at least one incandescent electric lamp mounted in said casing; said motor and lamp being operated by the vehicle's storage battery. A manually-operated switch on the dash board is in circuit to operate said motor and lamp for as long as it is maintained closed. I shall refer to this lamp as the safety lamp herein, so as to distinguish it from the stop light lamps and back-up light lamps which are included in present signal light systems. It is also advisable to have on the dash board, a pilot lamp which lights up while the safety lamp is lit.

Since it is general practice to have signal lights at each side of the rear of a motor vehicle, I provide one of the safety lamp devices at each such position.

To incorporate the safety lamps in an existing signal light system on a motor vehicle, which includes stop light lamps operated by the foot brake and back-up lamps which are operated upon setting the drive for reverse, I have a relay device which normally connects the safety lamps in the circuit to be operated when say, the stop light lamps light. Upon operation of the reversing mechanism of the vehicle, the back-up lights are actuated and said relay is operated to disconnect the safety lamps from their association with the stop light lamps and to connect said safety lamps whereby they are actuated during the operation of said back-up lamps.

For new motor vehicles, I provide a system having the safety lamps and the back-up lamps, where the safety lamps are operated upon working of the foot brake, but both the safety and the back-up lamps are operated upon shifting the drive into reverse.

A detailed description of the safety lamps and the operating electrical circuits and their modes of operation will now be given.

In the accompanying drawing forming a part of this specification, similar characters of reference indicate corresponding parts in all the views.

Figure 1:
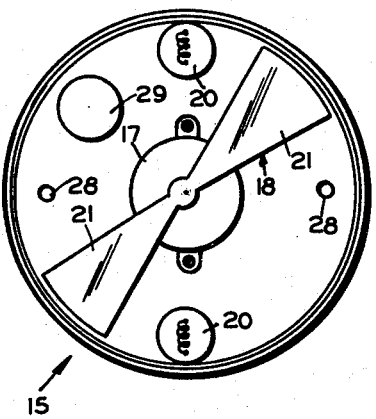
Fig. 1 is a front view of a preferred form of a safety lamp construction which embodies teachings of this invention.
Figure 2:
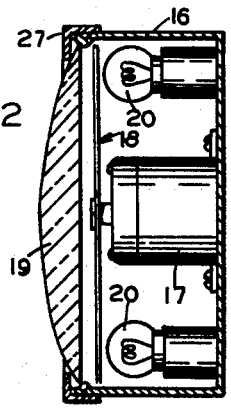
Fig. 2 is a section taken at line 2—2 in Fig. 1.
Figure 3:
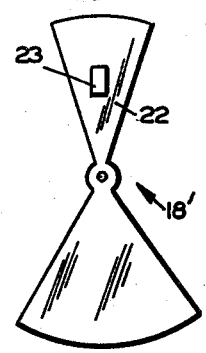
Fig. 3 is a front view of a vane of slightly modified construction.
Figure 4:
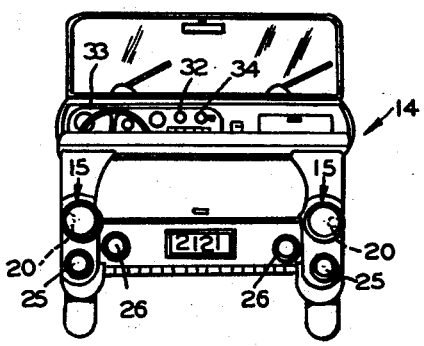
Fig. 4 is a rear view of a motor vehicle embodying this invention.

In the drawing, the safety signal lamp is designated generally by the numeral 15 and preferably comprises a cylindrical casing 16 housing a miniature electric motor 17 which drives a flat opaque vane 18. The casing 16 is closed by a glass lens 19 and contains at least one incandescent electric lamp 20. Said vane 18 moves in its own plane between the lamps 20 and the lens 19. Said vane may have two equal blades 21, of sufficient width to shield the lamps 20, or if desired, one vane may be about twice the width of the other as shown in Fig. 3, where the narrower vane 22 is preferably provided with a balance weight 23. The motor and the lamps 20 are of a type operable by the storage battery 24 of the motor vehicle 14, at the rear end of which, at each side thereof, a safety signal lamp 15 is mounted. In existing vehicles, there are already, the stop signal lamps 25 and the back-up signal lamps 26. Said lamps 25 are actuated upon an effective shift of the foot brake while the lamps 26 are actuated upon shift of the drive into reverse; said brake and reversing mechanism of the motor vehicle being not shown.

It is evident that upon operation of the motors 17, 17′ and the electric lamps 20, the action of the vane 18, or 18′, will be to progressively diminish the illumination intensity observed through the lens 19 and then to progressively increase such intensity to maximum. This acts to alert vehicle drivers and pedestrians positioned rearward of the vehicle 14; the speed of said motors 17, 17′, being relatively slow. When the vane 18′ is used, there occurs both a gradual illumination intensity viewable accompanied by a rather sharp change per revolution of vane. The lens 19 may be mounted in a removable bezel 27, to have access to the interior of the casing 16. Holes 28 serve for mounting the signal lamp 15 onto the vehicle and the hole 29 is provided for the admission of wires to make connection to the motor 17 and electric lamps 20 within the casing 16, so that they are properly in circuit to cooperate as will be explained with the other signal lamps on the vehicle.

Figure 5:
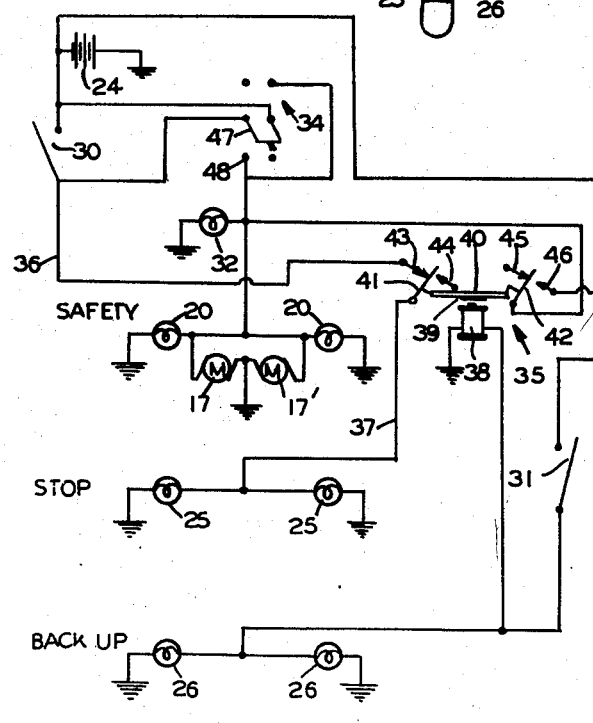
Fig. 5 is a wiring diagram of the electrical circuit employed when the safety lamps are incorporated in a present motor vehicle having stop signal lamps operated when the foot brake is worked and back-up signal lamps operated upon shifting the drive into reverse.

In signal systems now in use, a switch 30 operated to close upon working the foot brake of the vehicle, causes the actuation of the stop signal lamps 25, and a switch 31, operated to close upon shifting of the drive mechanism into reverse, causes the actuation of the back-up lamps 26. As shown in Fig. 5, I have added to such sysem, the safety signal lamps 20, an optional pilot lamp 32 mounted on the dashboard 33, the switch 34 which is also mounted on the dashboard and the electrical relay device indicated generally by the numeral 35, which may be mounted under the hood or other convenient place on the vehicle. It will be shown that all connections to said added components, are easily made. It might here be noted that in the original system heretofore existing, the conductor 36 was one with the conductor indicated by the numeral 37, and of course, the components 20, 32, 34 and 35, were absent. The previously existing electrical system as now modified by me and illustrated in Fig. 5, will now be described.

One terminal of the storage battery 24, one terminal of all electric signal lamps 20, 25, 26, 32, one terminal of each of the motors 17, 17' and one terminal of the electro-magnet 38 of the relay 35, are all grounded to the frame of the vehicle 14. For the switch 34, I use one of the double-pole, double-throw type, but in reality, I employ it as two single-pole single-throw switches; one being in closed condition when the other is open, or both are in open condition. The relay device 35 comprises the electro-magnet 38, whose armature 39 is on an insulating element 40, carrying the shiftable conductive switch elements 41 and 42 which are moved by armature travel. Switch element 41 is normally in contact with the fixed contact point 43, but upon actuation of the electro-magnet 38, said element 41 moves away from 43 and makes contact with the fixed contact point 44. The switch element 42 is normally in contact with the fixed contact point 45, but upon actuation of said electro-magnet 38, said element 42 moves away from 45 and makes contact with the fixed contact point 46. The other terminals of the lamps 20 and 32 are electrically connected to the switch element 42. The other terminals of the lamps 25 are electrically connected to the switch element 41. The other terminals of the lamps 26 and the other terminal of the electro-magnet 38 are all electrically connected to one terminal of the back-up switch 31. The other terminal of said back-up switch 31, the contact point 46 and one terminal of the brake switch 30 as well as one blade of the switch 45, are all electrically connected to the other terminal of the battery 24. The other terminal of said brake switch 30, the other blade 47 of the switch 34 and the contact point 43 are all electrically connected. Contact terminal 48 of the switch 34 is electrically connected to its diagonally opposite terminal of the switch 34 and also to the ungrounded terminals of the lamps 20, 32.

In normal use condition, the brake switch 30 and the back-up switch 31 are open and the switch 34 is set so that blade 47 contacts the terminal 48. All the signal lamps 20, 25, 26, 32 are unlit and the motors 17, 17' are still. The armature 39 is away from the electro-magnet 38. The switch element 41 is in contact with the contact point 43, and the switch element 42 is in contact with the contact point 46. It may here be noted that since there are no connections to the contact points 44 and 45, the relay device 35 really comprises two single-pole single throw switches, one of which is closed while the other is open; the elements 41 and 43 constituting one such switch and the elements 42 and 46 constituting the other of said switches.

Upon operation of the foot brake of the vehicle, switch 30 will close. Thereupon, the lamps 20 of the safety signal devices 15 will light up as well as the lamp 32 and the motors 17, 17' will operate. Also, the stop signal lamps 25 will be lit. Evidently, upon the opening of the brake switch 30, the apparatus will assume normal rest condition.

On operation of the reversing mechanism of the vehicle, the back-up switch 31 will close. Thereupon, the back-up signal lamps will become lit. Also, the electro-magnet 38 will be actuated, thereby causing element 42 to move into contact with point 46, and simultaneously causing element 41 to move away from point 43. Hence the stop signal lamps 25 will remain unlit, but the safety signal lamps 20, the pilot lamp 32 and the back-up signal lamps 26 will light up and of course the motors 17 and 17' will operate. It is evident that upon the opening of the back-up switch 31, the apparatus will assume normal rest condition.

Upon shifting the blades of the switch 34 to their upward setting in Fig. 5, the safety signal lamps 20, their motors 17, 17' and the pilot lamp 32 will be actuated and continue so long as said switch 34 remains in its upward setting. This is used as a distress signal calling for help while the vehicle is either in motion, or stalled or parked, due to breakdown or for any other reason. It is also advisable to use this while traveling in fog or when rain is heavy or when driving is hazardous as when roads are slippery, to signal caution to drivers behind.

Figure 6:
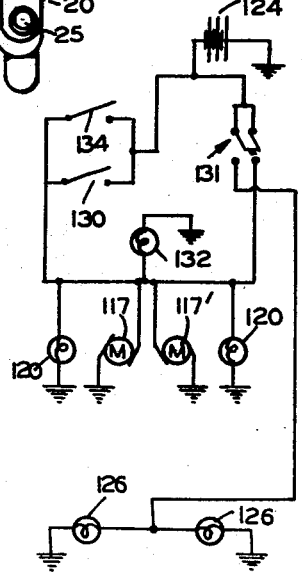
Fig. 6 shows the wiring diagram for use on cars being manufactured, where the safety lamps operate upon operation of the foot brake to serve as stop signal lights and where both the safety lamps and the back-up signal lamps operate upon shifting the drive into reverse.

In new vehicles to be manufactured, the system shown in Fig. 6 may be employed. Here, the stop signal lamps 25 are omitted, because the safety signal lamps now designated as 120, are made to serve in their stead. In so doing, the system has been materially simplified, by consisting of said lamps 120 and their associated motors 117, 117', the pilot lamp 132, the brake switch 130, the back-up signal lamps 126, the battery 124, an emergency single pole single throw switch 134 and a double pole, single throw back-up switch 131.

One of the terminals of each of the lamps 126, 120, 132 and one terminal of the battery 124 are grounded to the frame of the vehicle. The blades of the switch 131 are electrically connected to the other terminal of the battery 124 and to one terminal of each of the switches 134 and 130. The other terminals of said switches 134, 130 and one of the other terminals 150, of the switch 131, are all electrically connected with the other terminals of the lamps 120, 132 and with the other terminals of the motors 117, 117'. The remaining terminal of the switch 131 is electrically connected with the other terminals of the lamps 126.

In normal rest condition, all switches are open in this system of Fig. 6. Upon operation of the foot brake of the vehicle, switch 130 is closed, whereupon the lamps 120 and 132 and the motors 117, 117' will be actuated. Upon the opening of said switch 130, normal rest condition is restored. Upon operation of the reversing mechanism of the vehicle, the switch 131 will assume closed condition, whereupon all lamps and motors will be operated. For a distress signal, the operator closes the switch 134, whereupon, the safety signal lamps 120, the pilot lamp 132 and the motors 117, 117' will be in continuous operation until said switch 134 is opened.

In new vehicles to be manufactured, the installation of the signalling system shown in Fig. 6 is simple and economical. In present vehicles, conversion to the system shown in Fig. 5 is also easily made, by for instance, mounting the switch 34 and the pilot lamp 32 on the dashboard 33 and installing the safety signal devices 15 at suitable places at the rear of the vehicle structure. In vehicles where there is an accessible space behind the dash board, the relay device 35 may be mounted there, otherwise on framework which is covered by the hood or in the trunk compartment if there is one. Connections of the added apparatus to the apparatus existing are easily accomplished either at the terminals of the brake switch 30 and the back-up switch 31, or else to conductors along the vehicle structure leading to said switches. Several of the required conductors to which connections are to be made are accessible at the rear of the vehicle, where they come to the stop signal lamps 25 and the back-up signal lamps 26.

The function of my invention is to instantaneously alert oncoming vehicles that the car ahead is either stopping, stopped or disabled, or otherwise not moving with the normal flow or traffic. The motorist may flip on the manual switch 34 located on the dashboard, to warn oncoming vehicles that he is in distress and should use caution in approaching and passing.

To facilitate the definition of structure set forth in the appended claims, I shall refer to the switch 30 as the first switch, the switch 31 as the second switch, the switch comprising 42, 46 as the third switch, and the switch comprising 41, 43 as the fourth switch. The related single-pole, single throw switches comprise the switching device indicated at 34.

This invention is capable of numerous forms and various applications without departing from the essential features herein disclosed. It is therefore intended and desired that the embodiments shown herein shall be deemed illustrative and not restrictive and that the patent shall cover all patentable novelty herein set forth; reference being had to the following claims rather than to the specific description herein to indicate the scope of this invention.

I claim:

1. In a signal light system for a motor vehicle having an electrical energy source, a signal device comprising a casing having a mouth, electric light means positioned within said casing, a substantially flat vane across part of the casing, consisting of two radial arms, one of substantially larger area than the other; said vane being rotated in its own plane by said motor when the motor is actuated; the arms of said vane during rotation thereof, coming between said light means and the mouth of the casing, whereby each arm of said vane in the rotary movement thereof, respectively progressively shield said light means, a switch and a circuit powered by said energy source including said light means, motor and switch, whereby said light means and motor are actuated upon the closing of said switch.

2. A signal light system for a motor vehicle having an electrical energy supply, a brake and a reversing mechanism, a first switch normally in open condition, actuated to closed condition upon the actuation of said brake, a second switch normally in open condition, actuated to closed condition upon actuation of said reversing mechanism, a signal device comprising a casing having a mouth, an electric motor mounted in said casing, a first electric light means positioned within said casing, a substantially flat vane across part of the casing, comprising a radial arm; said vane being rotated in its own plane by said motor when such motor is actuated; the arm of said vane during rotation thereof coming between said light means and the mouth of the casing, whereby said arm in its rotary movement progressively shields said light means, a back-up signal electric lamp, a stop light signal electric lamp, an electrical relay device comprising an electro-magnet, an armature therefor, a normally closed third switch and a normally open fourth switch; means associating said armature with said third and fourth switches to open the third switch and to close the fourth switch upon actuation of said electro-magnet; one terminal of the energy supply being electrically connected to one terminal of each of the light means in the casing, the back-up signal lamp, the stop lamp, the motor and the electro-magnet; the other terminal of the energy supply being electrically connected to one terminal of each of the first, third and second switches; the other terminal of the first switch being electrically connected to one terminal of the fourth switch; the other terminal of the second switch being electrically connected to the other terminals of each of the back-up light and the electro-magnet; the other terminal of the third switch being electrically connected to the other terminals of each of the motor and the first light means and the other terminal of the fourth switch being electrically connected to the other terminal of the stop lamp.

3. A signal light system as defined in claim 2, including a switching device comprising two single-pole, single-throw switches, means associating said single-pole single-throw switches so that when one is in open condition, the other is in closed condition; one terminal of each of said single-pole, single throw switches being electrically connected to the second mentioned terminals of each of said motor and the first light means and the other terminals of such switches being electrically connected to the terminals of the first switch respectively.

References Cited in the file of this patent

UNITED STATES PATENTS

| 1,542,431 | White | June 16, 1925 |
| 2,266,201 | Heidel | Dec. 16, 1941 |
| 2,771,525 | Sivak | Nov. 20, 1956 |
| 2,814,029 | McCrea | Nov. 19, 1957 |
| 2,854,649 | Bosher | Sept. 30, 1958 |

OTHER REFERENCES

"Publication," Transactions of the Illuminating Engineering Society, February 1932, "Transmission of Light Through Fog," pages 231–232, vol. (XXXVII), No. 2.